United States Patent

Garside

Patent Number: 5,567,885
Date of Patent: Oct. 22, 1996

[54] MEASURING FLUID FLOW RATE

[75] Inventor: Robert M. Garside, Cumbria, England

[73] Assignee: British Nuclear Fuels PLC, England

[21] Appl. No.: 362,599

[22] PCT Filed: May 12, 1994

[86] PCT No.: PCT/GB94/01021

§ 371 Date: Mar. 1, 1995

§ 102(e) Date: Mar. 1, 1995

[87] PCT Pub. No.: WO94/27118

PCT Pub. Date: Nov. 24, 1994

[30] Foreign Application Priority Data

May 12, 1993 [GB] United Kingdom ............ 9309720

[51] Int. Cl.⁶ ............................................. G01F 1/704
[52] U.S. Cl. .................................. 73/861.07; 73/3
[58] Field of Search ........................... 73/861.07, 3

[56] References Cited

U.S. PATENT DOCUMENTS 3,036,229  5/1962  Kemp et al. .................. 307/115
3,435,660  4/1969  Sternberg ..................... 73/861.07
4,167,870  9/1979  Haas ............................ 73/861.07
5,062,291  11/1991  Asay ................................. 73/3

Primary Examiner—Richard Chilcot
Assistant Examiner—Jewel V. Artis
Attorney, Agent, or Firm—Nixon & Vanderhye

[57] ABSTRACT

A dilution technique for measuring the flow rate of a fluid stream includes injecting a tracer gas into a gas stream and then introducing the resulting tracer stock gas stream at a constant flow rate into the fluid stream. The concentration of tracer stock gas in a fluid stream sample is then obtained. A sample of the tracer stock gas stream is obtained at a point before this stream is introduced into the fluid stream. The resulting tracer stock gas stream sample is injected at a flow rate which can be varied, for example, by a peristaltic pump, into the gas stream. The concentration of a sample from the resulting tracer stock gas sample-in-gas stream sample is measured. By varying the flow rate of the tracer stock gas stream sample the two measured concentrations can be equalized. When the concentrations are equal, a relationship exists between the flow rates of the fluid stream, the tracer stock gas stream and the tracer stock gas stream sample. Since the latter two flow rates are known, the flow rate of the fluid stream can be determined.

13 Claims, 2 Drawing Sheets

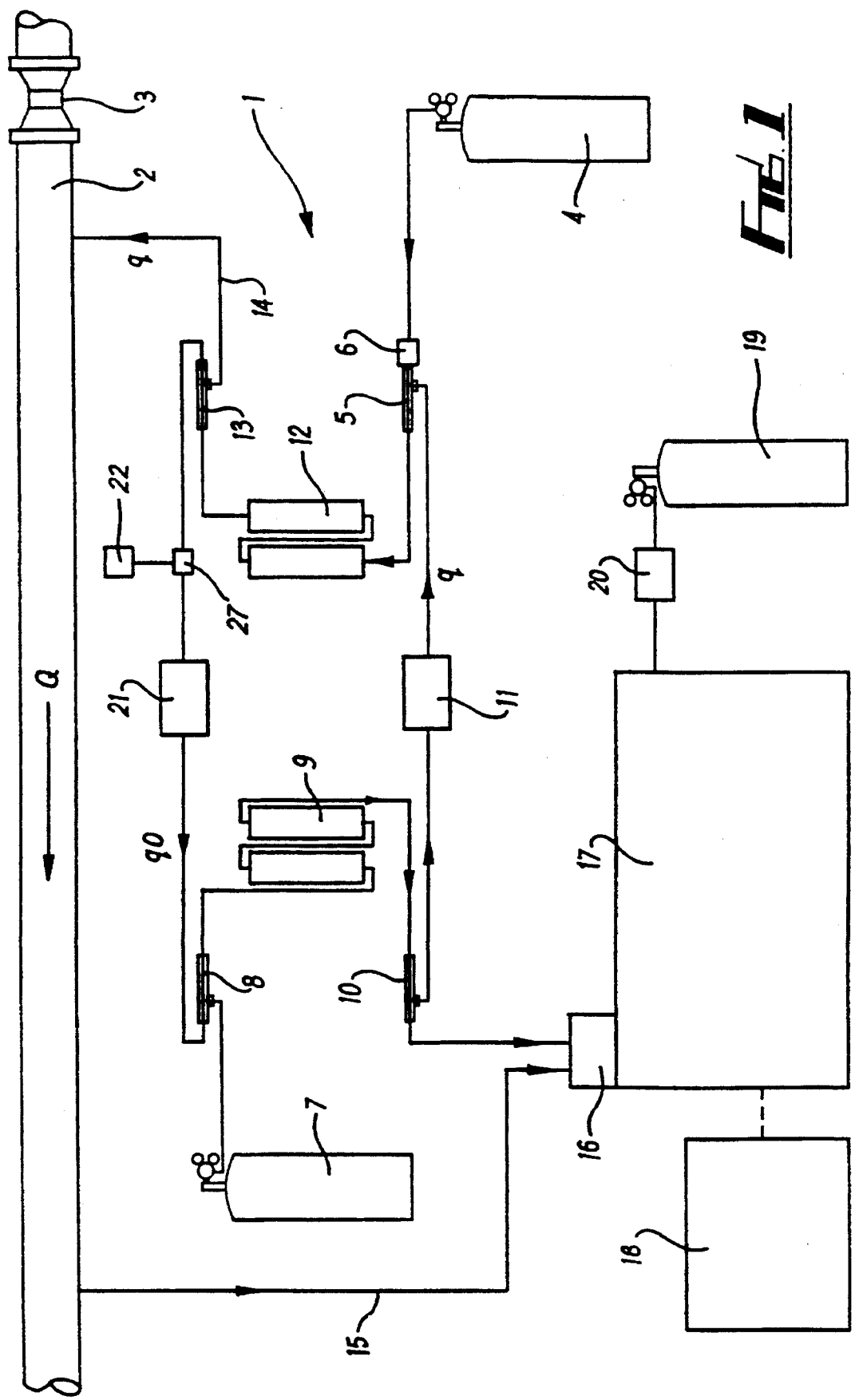

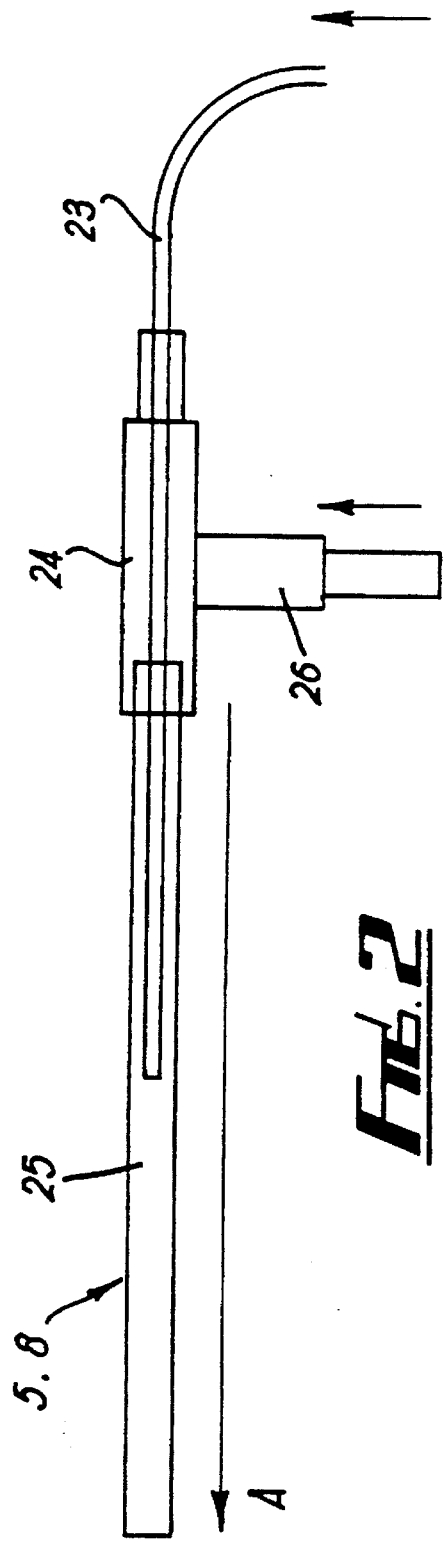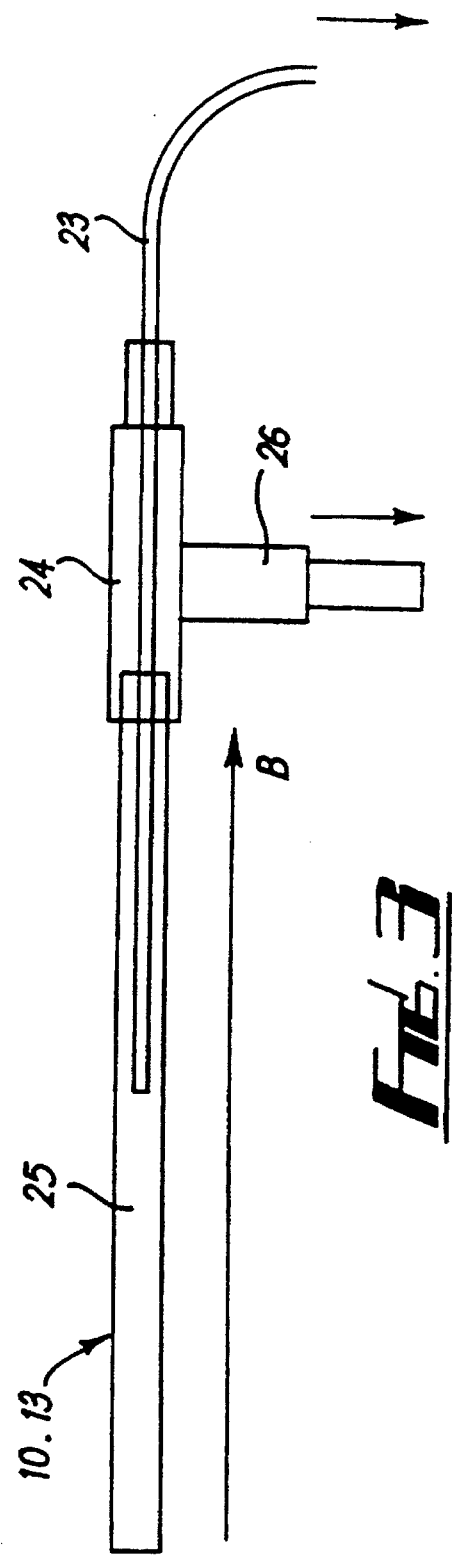

MEASURING FLUID FLOW RATE

The present invention relates to measuring the flow rate of a fluid stream using a dilution technique.

In particular, the invention relates to a feedback flow meter system using a dilution technique which can be used in the calibration of a fluid stream flowmeter.

Flowmeters require calibrating for use in a particular application and this requires obtaining independent measurements of the fluid stream flow rates through the flowmeter.

Several methods are known for calibrating flowmeters, one example of which utilizes the dilution technique. This technique involves introducing a tracer stock gas into the process fluid stream and measuring its resulting dilution or concentration. The amount of dilution is equal to the ratio of the flow rate of the tracer stock gas before introduction into the fluid stream to the flow rate of the process fluid stream. Thus, if the tracer stock gas flow rate and the dilution amount are known, then the flow rate of the process fluid stream can be determined. The tracer stock gas flow rate can be measured, for example, by a mass flow controller and one method of measuring the dilution is by means of a gas chromatograph equipped with an appropriate detector. A problem with this technique is that it is necessary to calibrate the gas chromatograph. Calibration is carried out by the provision of a set of gas bottles containing a range of known standard dilutions for passing through the gas chromatograph.

The preparation of the standard dilutions involves an intricate procedure comprising evacuating a set of gas bottles, carefully introducing into the bottles known volumes of tracer stock gas, forcing varying volumes of air into each of the bottles to produce the required range of dilutions, and then weighing the bottles. This procedure is very time consuming and requires careful attention since one mistake can render the whole set of bottles useless.

For accurate results calibration of the gas chromatograph is preferably carried out with the gas chromatograph connected to the process pipe. This has the disadvantage that it is necessary to transport the heavy gas bottles to the gas chromatograph. Furthermore, the tracer stock gas is rapidly used up and when a bottle has been emptied the set of standard dilutions prepared from it are no longer of any use.

It is an object of this invention to provide a method of measuring the flow rate of a fluid stream which is suitable for in-situ calibration of a flowmeter and which overcomes the aforementioned disadvantages.

It is also an object of this invention to avoid the need to measure the absolute concentrations of the tracer stock gas.

According to the invention we provide a method of measuring the flow rate of a fluid stream, the method comprising the steps of injecting a tracer gas into a gas stream having predetermined substantially constant flow rate during a period of measurement, introducing the resulting tracer stock gas stream into the fluid stream at said substantially constant flow rate, obtaining a sample of said fluid stream at a location downstream of the point at which the tracer stock gas stream is introduced and measuring the relative concentration of the tracer stock gas in the fluid stream sample, the method further including the steps of extracting a sample of said tracer stock gas stream at a location upstream of the point at which the tracer stock gas stream is introduced into the fluid stream, injecting said extracted tracer stock gas stream sample at a flow rate which can be varied into the gas stream to form a tracer stock gas sample-in-gas stream, obtaining a sample of said tracer stock gas sample-in-gas stream at a location downstream of the point at which the tracer stock gas stream sample is injected, measuring the relative concentration of the tracer stock gas stream sample in the tracer stock gas sample-in-gas stream and adjusting the flow rate of the extracted tracer stock gas stream sample so as to equalize the value of the two measured concentrations, whereby the conditions necessary to equalize the concentration values correspond to the flow rate of the fluid stream.

The sample of tracer stock gas sample-in-gas stream is preferably obtained at a location upstream of the point at which the tracer gas is injected into said gas stream.

Preferably the flow rate of the fluid stream is used to calibrate a flowmeter through which the fluid stream passes.

The gas stream preferably comprises an airstream.

In a preferred embodiment the tracer gas comprises sulphur hexafluoride.

According to a further aspect of the invention we provide apparatus for measuring the flow rate of a fluid stream, the apparatus comprising injection means for injecting a tracer gas into a gas stream having a predetermined substantially constant flow rate during a period of measurement, means for introducing the resulting tracer stock gas stream into the fluid stream at said substantially constant flow rate, means for obtaining a sample of said fluid stream at a location downstream of the point at which the tracer stock gas stream is introduced and a concentration measuring instrument for measuring the relative concentration of the tracer stock gas in the fluid stream sample, the apparatus further comprising extraction means for extracting a sample of said tracer stock gas stream at a location upstream of the point at which the tracer stock gas stream is introduced into the fluid stream, and further injection means for injecting said extracted tracer stock gas stream sample into the gas stream to form a tracer stock gas sample-in-gas stream, further extraction means for obtaining a sample of said tracer stock gas sample-in-gas stream at a location downstream of the point at which the tracer stock gas stream sample is introduced, the relative concentration of the tracer stock gas stream sample in the tracer stock gas sample-in- gas stream being measured by said concentration measuring instrument, wherein means are provided for varying the flow rate at which said extracted tracer stock gas stream sample is injected into the gas stream whereby the value of the two measured concentration values can be equalized to a value corresponding to the flow rate of the fluid stream.

Preferably the concentration measuring instrument includes a gas chromatograph.

The gas chromatograph preferably includes an electron capture detector which produces a chromatogram having an area which is proportional to the amount of tracer gas in the sample being measured.

Advantageously, the gas chromatograph includes a valve adapted to send samples of equal volume from either the fluid stream or the tracer stock gas sample-in-gas stream through the gas chromatograph.

Preferably the means for varying the flow rate of the extracted tracer stock gas stream sample is a variable speed pump. Suitably, the variable speed pump is a peristaltic pump.

A blender upstream of the extraction means is provided for mixing the tracer stock gas stream and a further blender is used to mix the tracer stock gas sample-in-gas stream.

Embodiments of the invention will now be described, by way of example, with reference to the accompanying drawings, in which:

FIG. 1 is a schematic diagram of a feedback flowmeter system for measuring the flow rate of a fluid stream.

FIGS. 2 and 3 show, respectively, an injector nozzle and a sampling nozzle used at injection and sampling points in the feedback flowmeter system.

Referring to FIG. 1, a feedback flowmeter system 1 is used to measure the flow rate Q of a process fluid stream 5 flowing through the pipe 2. The flowmeter system can be used to obtain an independent measurement of the process fluid stream flow rate for calibrating a flowmeter 3 installed in the pipe 2.

The feedback flowmeter system 1 includes a gas bottle 4 filled with a source of tracer gas, which is preferably sulphur hexafluoride. The tracer gas is supplied to an injection nozzle 5 (see FIG. 2) at a constant flow rate as determined by a fine metering valve 6 located at the injection nozzle inlet. Tracer gas is injected by the injection nozzle 5 into a gas stream, preferably an airstream, derived from a compressed air supply bottle 7. It will be apparent to those skilled in the art that other means for supplying the gas stream could be used. The air supply bottle 7 is equipped with a precision two-stage regulator designed to yield a delivery pressure which remains substantially constant as the air pressure in the bottle 7 reduces. The airstream is supplied to the injection nozzle 5 after passing through, in succession, an injection nozzle 8, an upstream blender 9, comprising two sample cylinders arranged in series, a sampling nozzle 10 and a mass flow controller 11. The mass flow controller 11 ensures a precise and constant flowrate q of the airstream to the injection nozzle 5.

The tracer stock gas stream issuing from the injection nozzle 5 is thoroughly mixed in a downstream blender 12 which comprises two sample cylinders connected in series. Other types of blenders could be used, if desired. From the downstream blender 12 the tracer stock gas stream passes to a sampling nozzle 13 (see FIG. 3) which is where a sample of the tracer stock gas stream is extracted into a tracer stock gas stream sample. The main tracer stock gas stream is then conveyed through a line 14 and introduced at a constant flow rate q, as determined by the mass flow controller 11, into the process fluid stream flowing through the pipe 2.

At a location downstream of the point at which the tracer stock gas stream is introduced into the pipe 2, a sample portion of the process fluid stream is extracted through a line 15. The line 15 conveys the fluid stream sample to a gas sample valve 16 which passes fluid stream samples of equal volume through a gas chromatograph 17. The gas chromatograph interfaces with a computer 18 and is equipped with a packed column and an electron capture detector. The fluid stream samples are passed through the gas chromatograph 17 by a carrier gas stream derived from a gas bottle 19. Impurities in the carrier gas stream are removed by a trap 20. Suitably, the carrier gas is nitrogen.

In order to separate oxygen from the samples prior to their passage through the electron capture detector they are passed through the packed column in the gas chromatograph 17. Each fluid stream sample causes a response from the detector in the form of a voltage peak which rises and then falls off again as the sulphur hexafluoride passes through the detector. Such a peak is referred to as a chromatogram and its area is directly proportional to the amount of sulphur hexafluoride in the sample volume causing it.

Since the gas valve 16 is designed to deliver samples of equal volume, the peak area is proportional to the concentration of the sulphur hexafluoride in the gas being sampled. This concentration is, in turn, proportional to the dilution of tracer stock gas stream in the process fluid stream, so the peak area is directly proportional to the dilution.

This relationship can be expressed as follows:

$D1 = K.A1$ where D1 is the dilution value of the tracer stock gas in the fluid stream sample, A1 is the chromatogram area, and K is the calibration constant for the chromatograph.

The dilution D1 is also equal to the ratio of the flow rate q of the tracer stock gas stream through the line 14, as set by the mass flow controller 11, to the flow rate Q of the process fluid stream through the pipe 2.

This relationship can be expressed as follows:

$D1 = q/Q$ therefore, $K.A1 = q/Q$

At the sampling nozzle 13 (see FIG. 3) a tiny sample of the sulphur hexafluoride tracer stock gas is continually extracted from the tracer stock gas stream issuing from the downstream blender 12. Extraction takes place at a point upstream of where this stream is introduced into the pipe 2. This tracer stock gas stream sample is fed at a measured flow rate qo by a variable-speed pump 21 to the injection nozzle 8. Preferably the pump 21 is a peristaltic pump which is capable of providing a low flow rate within precise limits.

Since the flow rate through the pump 21 is a function of both its upstream pressure and temperature, a pressure meter 22 is installed upstream of the pump. The pressure meter 22 is connected to the line through which the feedback stream flows by a crossover valve 27. The crossover valve serves to prevent old gas in the line to the pressure meter 22 from contaminating that in the tracer stock gas stream sample, thereby causing anomalous results. The tracer stock gas stream sample is injected at the injection nozzle 8 into the airstream derived from the air supply bottle 7 to form a tracer stock gas sample-in-air stream.

After thoroughly mixing the tracer stock gas sample-in-air stream in the upstream blender 9, a sample of the resulting gas stream passes through the sampling nozzle 10 (see FIG. 3) and is delivered to the gas sample valve 16. The gas sample valve 16 sends samples of equal volume through the gas chromatograph 17 to obtain a chromatogram in a manner as described previously for the process fluid stream samples. The area of each resulting chromatogram is proportional to the dilution of the tracer stock gas stream sample in the tracer stock gas sample-in-air stream.

This relationship can be expressed as follows:

$D2 = K.A2$ where D2 is the dilution value of the tracer stock gas stream sample in the tracer stock gas sample-in-air stream, and A2 is the chromatogram area.

The dilution D2 of the tracer stock gas stream sample is also equal to the ratio of the flow rate qo of the tracer stock gas stream sample to the flow rate q of the tracer stock gas sample-in-air stream. This relationship can be expressed as follows:

$D2 = qo/q$, therefore $K.A2 = qo/q$

If the flow rate qo is adjusted, by regulation of the pump 21, so that the dilutions of the two samples are equalized, then:

$D1 = D2$ $K.A1 = K.A2$ $q/Q = qo/q$, therefore $Q = q^2/qo \ldots (1)$

Since the values of q and qo are known, the flow rate of the process fluid stream Q in the pipe 2 can be determined.

In use, either sample process fluid gas, drawn from the pipe 2 through the line 15, or sample tracer stock gas sample-in-air stream is directed by a manifold, not shown, to the gas sample valve 16. The valve 16 sends, alternately, samples of equal volume from each stream to the gas chromatograph which records a pair of chromatograms relating to the two samples. To satisfy equation (1) above, the dilutions or concentrations of the two samples must be equalized. This is achieved by adjusting the pump 21 so as to regulate the flow rate qo of the tracer stock gas stream sample until the chromatograms are equalized. The ratio of the areas of the two members of a chromatogram pair will indicate whether the flow rate qo requires to be increased or decreased to make the members of the next recorded chromatogram pair equal. Upon equalization of the dilutions, the process fluid stream flow rate Q can be determined from equation (1), using the known values of q and qo. Conveniently this can be accomplished by the computer 18.

The flow measurement system has the advantage that it is not necessary actually to measure the absolute tracer stock gas concentrations, but only relative concentrations as represented by the chromatogram areas.

A calibration procedure for the flowmeter 3 can then be carried out by simultaneously measuring the process fluid stream flow rate and the flowmeter response over the full range of process flow rates.

Advantageously, the computer 18 can be adapted to control and monitor the feedback flow measuring system, the mass flow controller, the sampling systems and all ancillary equipment such as associated pressure and temperature transducers.

FIG. 2 illustrates the injection nozzles 5, 8 and FIG. 3 shows the sampling nozzles 10, 13. Both types of nozzles are of similar construction. Each type of nozzle has a small more tube 23 which passes through a tee 24, preferably a union tee, and extends centrally along a main line tube 25.

In the injection nozzles 5, 8 the small bore tube 23 points downstream with respect to the direction of flow (arrow A) along the main line tube 25. Gases injected through a branch 26 of the tee 24 and the small bore tube 23 flow in the same direction as the flow along the main line tube 25 so that interruptions to the injected flows are minimized.

Thus, for injection nozzle 5 tracer gas from the gas bottle 4 flows to the nozzle through the small bore tube 23 and is injected into the airstream, which flows from the mass flow controller 11 through the tee branch 26. The resulting tracer stock gas stream issuing from the nozzle 5 is directed to the downstream blender 12 through the main line tube 25.

At the injection nozzle 8 the tracer stock gas stream sample stream flows to the nozzle through the small bore tube 23 from the pump 21. This sample stream is injected into the airstream, derived from the air supply bottle 7, flowing through the tee branch 26. The resulting tracer stock gas sample-in-air stream is directed through the main line tube 25 to the upstream blender 9.

For the sampling nozzles 10, 13 the small bore tube 23 points upstream with respect to the direction of flow (arrow B) along the main line tube 25. In this way, the dynamic pressure of the fluid stream in the tube 25 is advantageously utilized to help to drive the gases through the small bore tube 23.

Thus, for sampling nozzle 13 the tracer stock gas stream from the downstream blender 12 flows to the nozzle through the main line tube 25. The tracer stock gas stream flows through the tee branch 26 and is conveyed through the line 14 for introduction into the process fluid stream flowing through the pipe 2. A sample of the tracer stock gas stream is obtained by the small bore tube 23 through which the sample stream is fed to the pump 21.

At the sampling nozzle 10 the tracer stock gas sample-in-air stream from the upstream blender 9 flows to the nozzle through the main line tube 25. The air stream flows through the tee branch 26 and is directed to the mass flow controller 11. A sample of the airstream is obtained by the small bore tube 23 through which the sample stream is passed to the valve 16.

The feedback flow measurement system can be used in the calibration of flowmeters employed in the measurement of the flow rates of radioactive discharges to the environment. Suitable applications include the calibration of permanently installed Venturi and Dall-tube flowmeters. Further applications for the feedback flowmeter system include the monitoring of various types of industrial wastes where it is important to ensure that emissions do not exceed statutory limits. The system can also be used for measuring the flow rates of process streams composed of materials such as gas or oil where revenue is closely related to flow rate accuracy. The basic principle of the system can be used for measuring the flow rate of almost any fluid flowing in an accessible pipe or duct, regardless of the operating conditions, and could even be used in medical applications.

The system is particularly suitable for in-situ measurement or checking of the flow calibrations of flowmeters, particularly if these cannot be removed for calibration or if there is no other method available for obtaining accurate independent flow measurements for their calibration.

I claim:

1. A method of measuring the flow rate of a fluid stream, the method comprising the steps of injecting a tracer gas into a gas stream having a pre-determined substantially constant flow rate during a measurement period, introducing the resulting tracer stock gas stream into the fluid stream at said substantially constant flow rate, obtaining a sample of said fluid stream at a location downstream of the point at which the tracer stock gas stream is introduced and measuring the relative concentration of the tracer stock gas in the fluid stream sample, the method further including the steps of extracting a sample of said tracer stock gas stream at a location upstream of the point at which the tracer stock gas stream is introduced into the fluid stream, injecting said extracted tracer stock gas stream sample at a flow rate which can be varied into the gas stream to form a tracer stock gas sample-in-gas stream, obtaining a sample of said tracer stock gas sample-in-gas stream at a location downstream of the point at which the tracer stock gas stream sample is injected, measuring the relative concentration of the tracer stock gas stream sample in the tracer stock gas sample-in-gas stream and adjusting the flow rate of the extracted tracer stock gas stream sample so as to equalize the value of the two measured concentrations, whereby the conditions necessary to equalize the concentration values correspond to the flow rate of the fluid stream.

2. A method according to claim 1, wherein the sample of tracer stock gas sample-in-gas stream is obtained at a location upstream on the point at which the tracer gas is injected into said gas stream.

3. A method according to claim 1, wherein the flow rate is used to calibrate a flowmeter through which the fluid stream passes.

4. A method according to claim 1 wherein the gas stream comprises an airstream.

5. A method according to claim 1 wherein the tracer gas comprises sulphur hexafluoride.

6. Apparatus for measuring the flow rate of a fluid stream, the apparatus comprising injection means for injecting a tracer gas into a gas stream having a predetermined substantially constant flow rate during a measurement period, means for introducing the resulting tracer stock gas stream into the fluid stream at said substantially constant flow rate, means for obtaining a sample of said fluid stream at a location downstream of the point at which the tracer stock gas stream is introduced and a concentration measuring instrument for measuring the relative concentration of the tracer stock gas in the fluid stream sample, the apparatus further comprising extraction means for obtaining a sample of said tracer stock gas stream at a location upstream of the point at which the tracer stock gas stream is introduced into the fluid stream, and further injection means for injecting said extracted tracer stock gas stream sample into the gas stream to form a tracer stock gas sample-in-gas stream, further extraction means for obtaining a sample of said tracer stock gas sample-in-gas stream at a location downstream of the point at which the tracer stock gas stream sample is injected, the relative concentration of the tracer stock gas stream sample in the tracer stock gas sample-in-gas stream being measured by said concentration measuring instrument, wherein means are provided for varying the flow rate at which said extracted tracer stock gas stream sample is injected into the gas stream whereby the values of the two measured concentration values can be equalized to a value corresponding to the flow rate of the fluid stream.

7. Apparatus according to claim 6 wherein the concentration measuring instrument includes a gas chromatograph.

8. Apparatus according to claim 7 wherein the gas chromatograph includes an electron capture detector which produces a chromatogram having an area which is proportional to the amount of tracer gas in the sample being measured.

9. Apparatus according to claim 7 wherein the gas chromatograph includes a valve adapted to send samples of equal volume from either the fluid stream or the tracer stock sample-in-gas stream through the gas chromatograph.

10. Apparatus according to claim 4 wherein the means for varying the flow rate of the extracted tracer stock gas stream sample is a variable speed pump.

11. Apparatus according to claim 10 wherein the variable speed pump comprises a peristaltic pump.

12. Apparatus according to claim 1 wherein a blender is provided upstream of the extraction means for mixing the tracer stock gas stream.

13. Apparatus according to claim 1 wherein a further blender is provided upstream of said further extraction means for mixing the tracer stock gas sample-in-gas stream.

* * * * *